(12) United States Patent
Yamauchi

(10) Patent No.: US 6,587,604 B2
(45) Date of Patent: Jul. 1, 2003

(54) OPTICAL SEMICONDUCTOR DEVICE

(75) Inventor: Shohgo Yamauchi, Nakakoma (JP)

(73) Assignee: Fujitsu Quantum Devices, Ltd., Yamanashi (JP)

( * ) Notice: Subject to any disclaimer, the term of this patent is extended or adjusted under 35 U.S.C. 154(b) by 0 days.

(21) Appl. No.: 09/962,453

(22) Filed: Sep. 26, 2001

(65) Prior Publication Data
US 2002/0038900 A1 Apr. 4, 2002

(30) Foreign Application Priority Data
Sep. 29, 2000 (JP) ......................... 2000-301490

(51) Int. Cl.[7] ............................................... G02F 1/035
(52) U.S. Cl. ................. 385/3; 385/9; 385/28; 385/43; 385/45; 385/129; 385/130
(58) Field of Search .................. 385/1–9, 41, 42, 385/45, 50, 129, 130, 28, 43

(56) References Cited

U.S. PATENT DOCUMENTS

| 5,015,053 A | * | 5/1991 | Johnson | 385/2 |
|---|---|---|---|---|
| 5,166,988 A | * | 11/1992 | Bobb et al. | 385/1 |
| 5,278,926 A | * | 1/1994 | Doussiere | 385/28 |
| 5,347,601 A | * | 9/1994 | Ade et al. | 385/3 |
| 5,479,546 A | * | 12/1995 | Dumais et al. | 385/43 |
| 5,483,609 A | * | 1/1996 | Nakaya | 385/29 |
| 5,652,807 A | * | 7/1997 | Fukuchi | 385/3 |
| 5,655,034 A | * | 8/1997 | Ishizaka et al. | 385/3 |
| 5,694,504 A | * | 12/1997 | Yu et al. | 385/45 |
| 5,757,985 A | * | 5/1998 | Ishizaka | 385/2 |
| 5,799,119 A | * | 8/1998 | Rolland et al. | 385/28 |
| 6,088,500 A | * | 7/2000 | Zmudzinski et al. | 385/131 |

* cited by examiner

Primary Examiner—Akm Enayet Ullah
Assistant Examiner—Jennifer Doan
(74) Attorney, Agent, or Firm—Armstrong, Westerman & Hattori, LLP

(57) ABSTRACT

An optical semiconductor device includes an optical modulator and an optical detector formed integrally on a common substrate to form an optical integrated circuit, wherein an optical beam spot conversion part is provided also integrally on the common substrate so as to connect an output end of the optical modulator and an input end of the optical detector.

24 Claims, 8 Drawing Sheets

OPTICAL SEMICONDUCTOR DEVICE

CROSS-REFERENCE TO RELATED APPLICATION

The present application is based on Japanese priority application No. 2000-301490 filed on Sep. 28, 2000, the entire contents of which are hereby incorporated by reference.

BACKGROUND OF THE INVENTION

This invention generally relates to semiconductor devices and especially to an optical semiconductor device that extracts optical clock signals from an optical signal.

In the field of optical telecommunication technology, it is general to superimpose an optical clock signal to optical signals that are transmitted through an optical fiber. Thus, the optical clock signals have to be reproduced from the received optical signal in repeater devices or reception devices that are connected to the optical fiber.

FIG. 1 shows the construction of a known clock-extracting optical-detection device 100 used for reproducing optical clocks from such an optical signal.

Referring to FIG. 1, the clock-extracting optical-detection device 100 includes an optical coupler 11 coupled optically to an optical fiber 101 that transmits an optical signal having a frequency $f_0$ from an input end 101A to an output end 101B, and the optical signal in the optical fiber 101 is branched by the optical coupler 11 and are introduced into an optical modulator 12. The optical modulator 12 is driven by a driving signal having a frequency of $f_{clk}$ from a voltage-controlled oscillator 16 and modulates the optical signal that has been branched by the optical coupler 11. The optical signal thus modulated by the optical modulator 12 is then detected optically in an optical detector 13, and an output signal of frequency $f_0 - mf_{clk}$ is obtained.

The output signal of the optical detector 13 is then supplied to a phase comparator 15 for phase-comparison with a reference frequency signal supplied from a reference signal source 14 with a frequency $f_1$. The phase comparator 15 thereby produces a voltage signal representing the phase difference between the output signal of the photodetection circuit 13 and the reference frequency signal, and the voltage signal thus produced is supplied to a voltage-controlled oscillator 16. Thus, the frequency $f_{clk}$ of the driving signal is controlled so as to minimize the foregoing phase difference. In other words, the phase comparator 15 performs a feedback control of the voltage-controlled oscillator 16.

As a result of such a feedback loop operation, the phase difference is controlled to substantially zero, and the output frequency signal 102 of the voltage-controlled oscillator 16 in this state is taken out as the clock signal that is synchronized with the optical clock in the optical signal.

Conventionally, the optical modulator 12 and the optical detector 13 have been formed as individual components in such a clock-extracting detection device 100. The optical modulator 12 and the optical detector 13 have been connected by an optical fiber. However, such a construction is bulky and fragile, and has a problem of difficulty in realizing optical coupling without causing optical loss.

In view of the foregoing drawbacks of conventional construction, it is conceivable to form the optical modulator 12 and the optical detector monolithically on a common substrate in the form of integrated optical modulator/detector and to connect these units by a waveguide formed also monolithically on the common substrate. However, due to the inherent difference between the requirements imposed to an optical detector and the requirements imposed to an optical modulator, it is difficult to realize an efficient optical coupling between these units, in spite of the fact that both the optical modulator 12 and the optical detector 13 are formed based on a waveguide structure. Because of this reason, such a construction has not actually been attempted.

In the clock-extracting optical-detection device 100, it should be noted that the optical modulator 12 has an active layer that forms a part of the optical waveguide. Thereby, a refractive-index change or optical absorption is induced in the active layer in response to a voltage signal, and the optical beam propagating through the active layer undergoes optical modulation. On the other hand, the optical detector 13 has an optical absorption layer and detects the optical signal by detecting the optical carriers that are produced in response to absorption of the incoming optical beam by the optical absorption layer. Thus, in the event the optical waveguide is used to connect the optical modulator 12 and optical detector 13 formed monolithically on a common substrate, it is necessary that the optical waveguide achieves an efficient optical coupling both to the active layer of the optical modulator and the optical absorption layer of the optical detector.

Meanwhile, in the case of constructing the optical modulator 12 by a high-speed optical interferometer of Y-type or Mach-Zehnder-type, it is an indispensable condition that the optical modulator 12 performs a single mode operation for realizing a satisfactory extinction ratio.

FIG. 2 shows the relationship between the thickness d and width W imposed for the active layer of the optical modulator 12.

FIG. 2 is referred to.

Designating the curve shown in FIG. 2 as f(W), it should be noted that the active layer of the optical modulator 12 forms a single-mode waveguide when the condition d<f(W) is met. It functions as a multi-mode waveguide when the condition d>f(W) is met. Thus, in the case of operating the optical modulator 12 in single mode, it is desirable and necessary that the thickness d is increased when the width W is small and is decreased when the width W is large. As long as the relationship of FIG. 2 is maintained, the width W and the thickness d may be chosen appropriately so as to facilitate the fabrication process of the optical modulator 12.

On the other hand, FIG. 3 shows the relationship between the operational frequency band f of the optical detector and the thickness d.

As can be seen from FIG. 3, the distance, and hence the time, for an optically excited carrier to move through the optical absorption layer and reach an electrode is increased when the thickness of the optical absorption layer is large. Thereby, the operational frequency band f of the optical detector becomes inevitably low. Thus, it is preferable to reduce the thickness of the optical absorption layer from the viewpoint of improving the response characteristics of the optical detector. In the optical detector, it should be noted that the optical beam is not needed to be a single mode beam in the optical absorption layer.

In the event the thickness of the optical absorption layer is small like this, on the other hand, it is not possible to provide sufficient photodetection sensitivity, unless the length L of the optical absorption layer shown in FIG. 4 is increased so that the optical beam is absorbed sufficiently. Alternatively, the width has to be increased so that the cross-section area of the optical absorption layer is increased. To increase the cross-section area of the optical absorption layer without increasing the thickness, there is no way but to increase the width of the optical absorption layer. However, such an increase of width of the optical absorption layer invites an increase of area of the optical absorption layer and associated increase of parasitic capacitance. When there occurs such an increase of parasitic capacitance, there occurs a decrease of operational frequency band f of the photodetector 13 as shown in FIG. 5. Associated with this, the response speed is decreased. Thus, the optical absorption layer of the optical detector has to be designed in view of the relationship of FIGS. 3–5 such that the frequency band and the photodetection sensitivity are both optimized. The restriction thus imposed on the design of the optical detector 100 is stricter than the case of optimizing the shape of the active layer of the optical modulator 12.

Thus, the requirement imposed on the optical absorption layer of the optical modulator 12, especially on the aspect ratio thereof, is different from the requirement that is imposed on the aspect ratio of the optical absorption layer of the optical detector. Because of this, no desirable optical coupling is achieved when these devices are simply connected by an optical waveguide, and it has been inevitable to suffer substantial optical loss in the event the optical modulator 12 and the optical detector 13 are to be formed on a common substrate in the construction of FIG. 1.

SUMMARY OF THE INVENTION

Accordingly, it is a general object of the present invention to provide a novel and useful optical semiconductor device wherein the foregoing problems are eliminated.

Another and more specific object of the present invention is to provide an optical semiconductor device in which an optical modulator and an optical detector are integrated on a common substrate in a state of being coupled optically with high efficiency.

Another object of the present invention is to provide an optical semiconductor device, comprising:

a substrate;

an optical waveguide formed on said substrate, said optical waveguide constituting an interferometer-type optical modulator;

an optical absorption layer formed on said substrate in optical coupling with said interferometer-type optical modulator, said optical absorption layer forming an optical detector; and an optical-spot conversion part interposed on said substrate between an output end of said optical waveguide and an input end of said optical absorption layer, said optical-spot conversion part converting a spot radius of an optical beam between said interferometer-type optical modulator and said optical detector.

Another object of the present invention is to provide an optical semiconductor device, comprising:

a substrate;

an optical waveguide formed on said substrate, said optical waveguide constituting an interferometer-type optical modulator; and an optical absorption layer formed on said substrate in optical coupling with said optical waveguide, said optical absorption layer forming an optical detector.

According to the present invention, the optical modulator and the optical detector are formed monolithically on a common substrate. Further, an optical-spot conversion part is formed monolithically between the optical modulator and the optical detector. As a result, it becomes possible to implement clock extraction and optical detection with high reliability while using a simple construction. According to the present invention, a high optical coupling is guaranteed between the optical modulator and the optical detector while using a simple construction.

Other objects and further features of the present invention will become apparent from the following detailed description when read in conjunction with the attached drawings.

DETAILED DESCRIPTION OF THE INVENTION

PRINCIPLE

Figure 6:
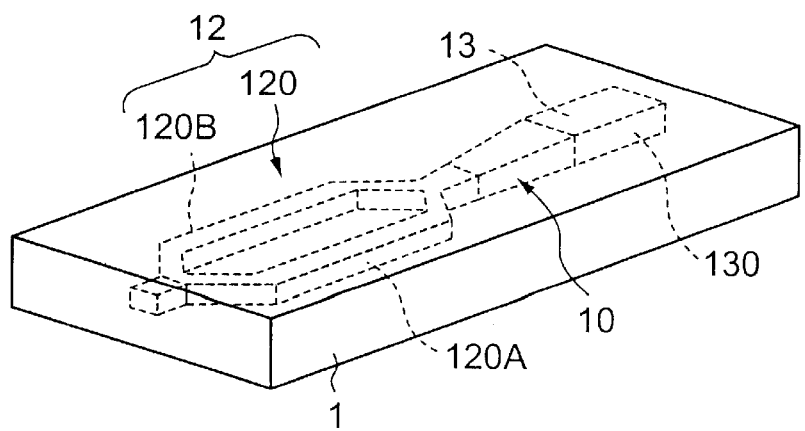
FIG. 6 is a diagram explaining the principle of the present invention.

FIG. 6 is a diagram that shows the principle of the present invention, wherein those parts corresponding to the parts described previously are designated by the same reference numerals and the description thereof will be omitted.

Referring to FIG. 6, an optical interferometer 120 constituting the interferometer-type optical modulator 12 and an optical absorption layer 130 constituting the optical detector 13 are formed on the substrate 1 monolithically. Further, an optical-spot conversion part 10 is formed also monolithically on the substrate 1 between the optical interferometer 120 and the optical absorption layer 130.

Figure 2:
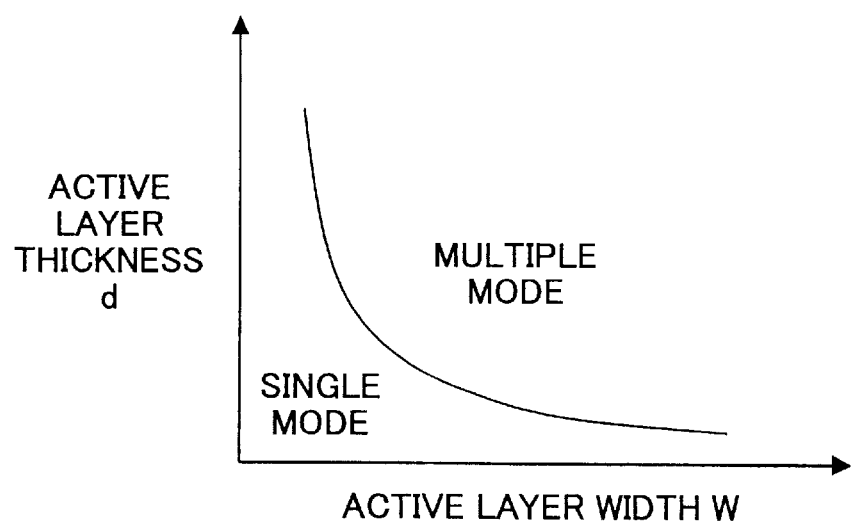
FIG. 2 is a diagram showing the relationship between the width and thickness of an active layer and optical mode of the optical waveguide in an optical modulator.

In more detail, the optical interferometer 120 includes optical waveguides 120A and 120B that are branched at an input-end thereof and merge again at an output-end thereof, and the optical-spot conversion part 10 is formed of an optical waveguide that connects the exit-end of the optical interferometer 120 to the input-end of the optical absorption layer 130. As explained with reference to FIG. 2 previously, each of the optical waveguides 120A and 120B constituting the optical interferometer 120 is formed of a single-mode waveguide that satisfies the relationship d<f(W). Thus, the optical signal incident to the input-end of the interferometer 120 and traveling through the optical waveguide 120A experiences a phase shift with respect to the optical signal that has entered to the interferometer 120 at the input-end and traveling through the optical waveguide 120B, when an electric field is induced by way of application of a modulation voltage to an electrode formed on one or both of the optical waveguides 120A and 120B not illustrated in FIG. 6. When the two optical beams are merged at the output end, there occurs a modulation in the optical signal as a result of interference of the two optical signals.

Figure 3:
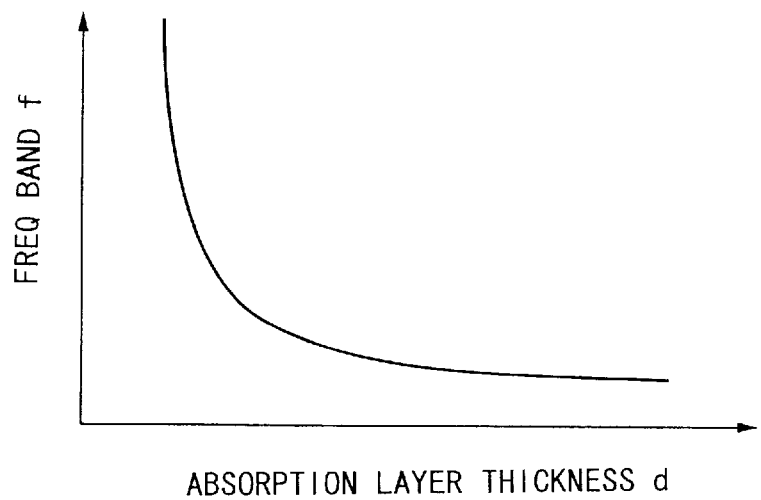
FIG. 3 is a diagram showing the relationship between the-layer thickness of an optical absorption and operational frequency band of a photodetector.
Figure 4:
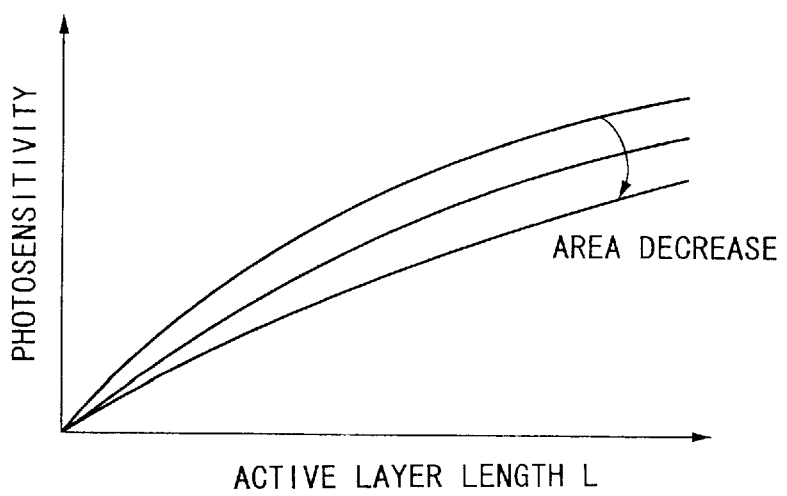
FIG. 4 is a diagram showing the relationship between the length of an optical absorption layer and photodetection sensitivity of a photodetector.
Figure 5:
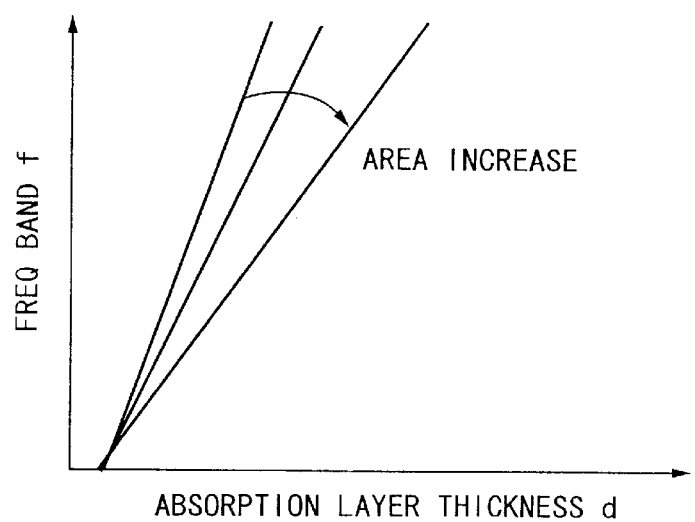
FIG. 5 is another diagram showing the relationship between the thickness of an optical absorption layer and operational frequency band of a photodetector.

On the other hand, the optical absorption layer 130 constituting the optical detector 13 has an optimum width and thickness that are different from those of the optical waveguide 120A or 120B, as explained previously with reference to FIGS. 3–5. Thus, the optical-spot conversion part 10 changes one or both of the width and thickness thereof from the first end part corresponding to output end of the optical interferometer 120 to the second end part corresponding to the input-end of the optical absorption layer 130, and thus, the width and thickness of the optical-spot conversion part 10 is changed from a first width and a first thickness corresponding to the width and thickness of the optical waveguides 120A and 120B to a second width and a second thickness corresponding to the width and thickness of the optical absorption layer.

According to the present invention, it becomes possible to connect the optical modulator and the optical detector, in an optical semiconductor device in which the optical modulator and the optical detector are integrated on a common substrate, with high optical efficiency, by providing the optical-spot conversion part between the optical modulator, in which a single-mode operation is required, and the optical detector that is required to have a high-speed response and high-sensitivity.

Other objects and further features of the present invention will become apparent from the following detailed description when read in conjunction with the attached drawings.
First Embodiment FIG. 7 shows the construction of an optical semiconductor device 20 according to a first embodiment of the present invention.

Figure 7:
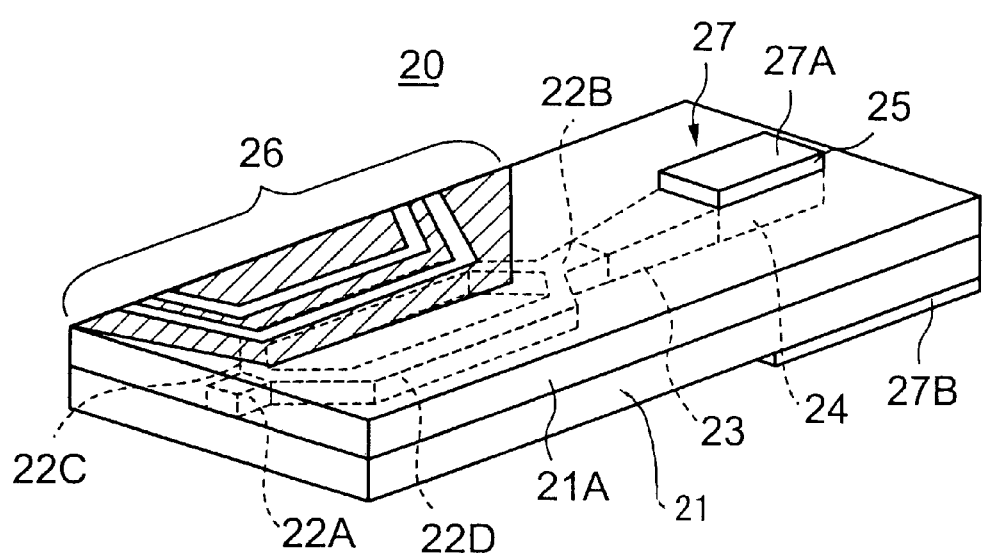
FIG. 7 is a diagram showing the construction of an optical semiconductor device according to a first embodiment of the present invention.

Referring to FIG. 7, the optical semiconductor device 20 is formed on an n-type InP substrate 21 that carrying thereon an n-type buffer layer (not illustrated). On the InP substrate 21, there are formed an input-side optical waveguide 22A and an output-side optical waveguide 22B, and first and second optical waveguides 22C and 22D so as to branch at the input-side optical waveguide 22A and merge again at the output-side optical waveguide 22B by means of an undoped InGaAsP epitaxial layer. The first and second optical waveguides 22C and 22D form a monolithic optical interferometer on the InP substrate 21 together with the input-side optical waveguide 22A and output-side optical waveguide 22B.

On the substrate 21, an optical waveguide 23 of an undoped InGaAsP pattern that constitutes the optical-spot conversion part to be described later is formed epitaxially in continuation to the output end 22B of the optical interferometer, wherein the optical waveguide 23 changes the thickness and width thereof from an input end thereof continuing from the output end 22B of the optical interferometer to an output end formed at the opposite side. Further, an optical absorption layer 24 of undoped InGaAs is formed epitaxially on the substrate 21 in continuation with the output end of the optical waveguide 23. On the optical absorption layer 24, a p-type InP layer 25 is further formed epitaxially, and a high-resistance InP layer 21A is formed on the InP substrate 21 so as to bury the optical waveguides 22C and 22d, the optical waveguide 23 and the optical absorption layer 24.

On the high-resistance InP layer 21A, an electrode 26 of coplanar-type is formed so as to cover the waveguide 21A, and a p-type electrode pattern 27A is formed on the p-type InP layer 25. Further, an n-type electrode pattern 27B is formed on the bottom principal surface of the InP substrate 21 in the position corresponding to the optical absorption layer 24.

By supplying a modulation voltage signal to the coplanar electrode 26 in such optical semiconductor device 20, the phase of the optical signal that propagates through the optical waveguide 22C is changed. Thus, by causing interference of the optical signal in the optical waveguide 22C and the optical signal in the optical waveguide 22D at the output-end 22B, the desired optical modulation is achieved. Thus, the optical waveguides 22A–22D and the modulator electrode 26 build up the interferometer-type optical modulator. In the following, the interferometer-type optical modulator will be designated by the reference numeral 26.

The optical signal thus modulated by the optical modulator 26 is then guided to the optical absorption layer 24 through the optical waveguide 23 and cause optical excitation of careers in the optical absorption layer 24. By applying a reverse bias voltage across the electrodes 27A and 27B, the carriers thus excited are detected in the form of a current signal. Thus, the n-type InP substrate 21, the optical absorption layer 24, the p-type InP layer 25 and the electrodes 27A and 27B form together a photodiode 27.

In the interferometer-type optical modulator 26, it is preferable that the optical waveguides 22A–22D form a single-mode waveguide for clear detection of extinction. For this purpose, the optical waveguides 22A–22D may be formed to have a width of 1.0 μm and a thickness of 0.1 μm for example, in accordance with the relationship explained previously with reference to FIG. 2. On the contrary, the 25 optical absorption layer 24 is formed in the photodiode 27 so as have a width of 6.0 μm and the thickness of 0.5 μm, for example, for maximizing the response speed and photodetection sensitivity.

Thus, the optical-spot conversion part 23 has the width of 1.0 μm and the thickness of 0.1 μm at the first end part continuing to the optical waveguide 22B in correspondence to the width and thickness of the optical waveguide 22B. At the second end part continuous to the optical absorption layer 26, on the other hand, the optical-spot conversion part 23 has the thickness of the width of 6.0 μm and thickness of 0.5 μm in correspondence to the width and thickness of the optical absorption layer 24. Thus, the waveguide that forms the optical-spot conversion part 23 changes the width and thickness thereof from the first end part to the second end part. Thereby, the optical beam exiting out the optical waveguide 22B is introduced substantially entirely to the optical absorption layer 24 through the optical-spot conversion part 23, and an efficient optical coupling is realized between the optical modulator 26 and the photodetector 27.

By using such an optical semiconductor device 20 in the clock-extracting optical-detection device 100 explained previously with reference to FIG. 1 in place of the optical modulator 12 and the optical detector 13, it becomes possible to simplify and miniaturize the construction of the device 100 substantially.

It should be noted that the optical semiconductor device 20 of FIG. 7 can be fabricated easily by using a tapered mask pattern at both lateral sides of the region, on which the optical-spot conversion part 23 is to be formed, during the MOVPE process for forming an InGaAsP layer on the InP substrate 21. By forming such a tapered mask pattern, the InGaAsP layer is formed with uniform thickness in the region of the optical modulator 26, while in the region for the optical-spot conversion part 23, the InGaAsP layer is formed so as to change the thickness continuously. By patterning the InGaAsP layer thus formed, it becomes possible to form the waveguide that changes the thickness thereof for the optical-spot conversion part 23 simultaneously to the optical waveguides 22A–22D.

After the optical waveguides 22A–22D and the optical absorption layer 24 are patterned, the p-type InP layer 25 is deposited on the optical waveguides 22A–22D and further on the optical absorption layer 24, and the high-resistance InP layer 21A is deposited further thereon. By forming the coplanar electrode 26 and the photodiode electrodes 27A and 27B thereafter, the optical semiconductor device 20 is obtained.

It should be noted that the process of fabricating the optical semiconductor device 20 is not limited to such a particular process, but the optical semiconductor device 20 may be formed by other processes.

FIGS. 8A–8F shows various modifications of the optical-spot conversion part 23.

Figures 8A, 8B, 8C:
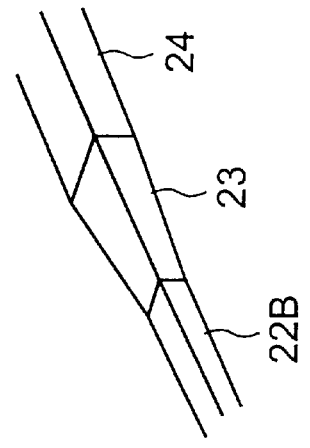
FIGS. 8A, 8B, 8C, 8E and 8F are diagrams showing various modifications of the optical-spot conversion part used in the optical semiconductor device of FIG. 7.

Referring to FIGS. 8A–8F, FIG. 8A shows a modification in which only the width of the spot-conversion part is increased continuously from the first end part, which continues to the optical waveguide 22B, to the second end part continuing to the optical absorption layer 24, to form a tapered structure. On the other hand, FIG. 8B shows a modification in which the thickness alone is increased in the spot-conversion part continuously from the first end part, which continues to the optical waveguide 22B, to the second end part continuing to the optical absorption layer 24, to form a tapered structure. Furthermore, FIG. 8C shows a modification in which both of width and thickness are increased in the spot-conversion part continuously from the first end part, which continues to the optical waveguide 22B, to the 2nd end part continuing to the optical absorption layer 24 to form a tapered structure.

Figures 8D, 8E, 8F:
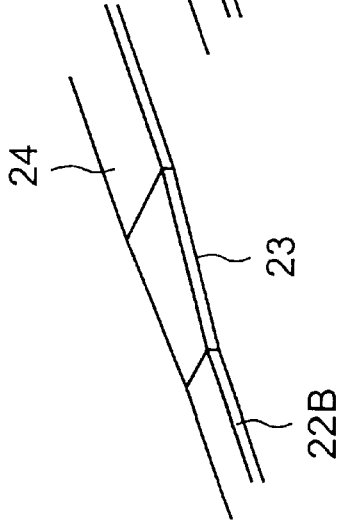

Further, FIG. 8D shows a modification in which the width of the spot-conversion part alone is increased stepwise from the first end part continuing to the optical waveguide 22B to the second end part continuing to the optical absorption layer 24, while FIG. 8E shows a modification in which the thickness of the spot-conversion part alone is increased stepwise from the first end part continuing to the optical waveguide 22B to second end continuing to the optical absorption layer 24. Furthermore, FIG. 8F shows a modification in which both the width and thickness of the spot-conversion part are increased stepwise from the first end part continuing to the optical absorption layer 24 to second end part continuing to the optical waveguide 22B.

In optical semiconductor device 20 of FIG. 7, any of the constructions of the optical-spot conversion part 23 shown in FIGS. 8A–8F provides efficient optical coupling between the optical modulator 26 and the photodetector 27.

Second Embodiment

Figure 9:
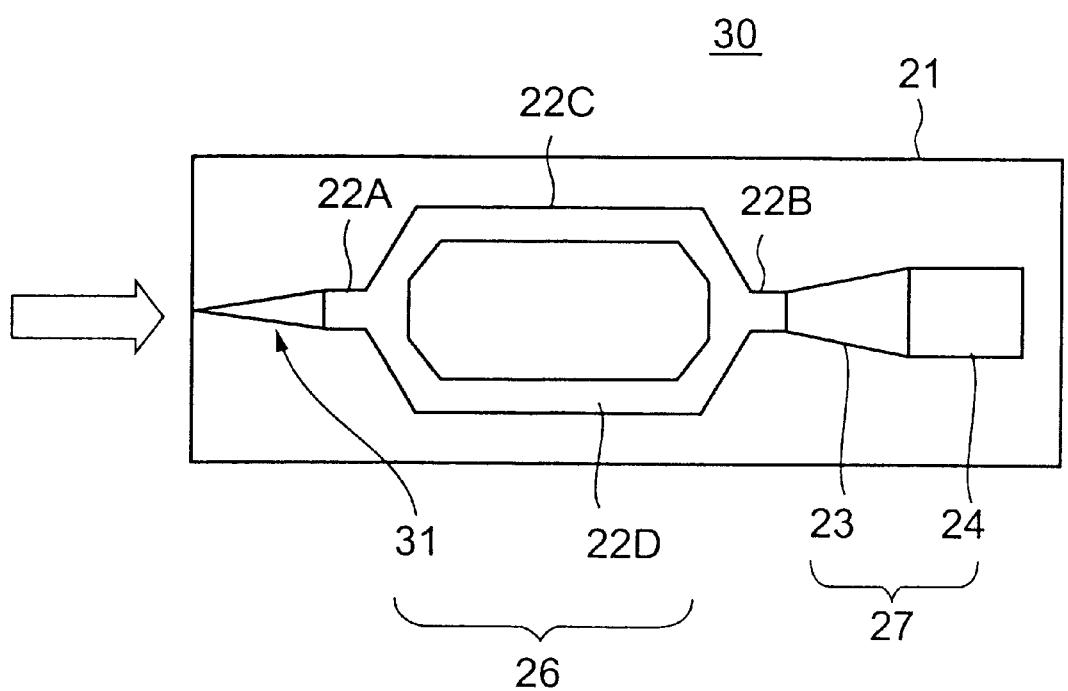
FIG. 9 is a diagram showing the construction of an optical semiconductor device according to a second embodiment of the present invention.

FIG. 9 shows the construction of an optical semiconductor device 30 according to a second embodiment of the present invention, wherein those parts corresponding to the parts described previously are designated by the same reference numerals and the description thereof will be omitted. In FIG. 9, only the pattern formed on the substrate 21 is represented, and illustration of the high-resistance InP layer 21A and the electrodes 26 and 27A formed thereon are omitted.

Referring to FIG. 9, the optical semiconductor device 30 of the present embodiment has a construction similar to that of the optical semiconductor device 20 of FIG. 7, except that a different optical-spot conversion part 31 is provided at the tip end of the input-side optical waveguide 22A.

In the example of FIG. 9, it should be noted that the optical-spot conversion part 31 has a tapered form having a narrowing width toward the distal end part thereof and functions so as to collect the optical beam, which comes out from the optical fiber connected to the distal end part, efficiently into the optical waveguide 22A. Thus, by providing such an optical-spot conversion part 31, it becomes possible to improve the optical coupling efficiency between the optical fiber and the optical modulator 26 significantly.

FIGS. 10A–10F show various examples of the optical-spot conversion part 31.

Figures 10A, 10B, 10C, 10D, 10E, 10F:
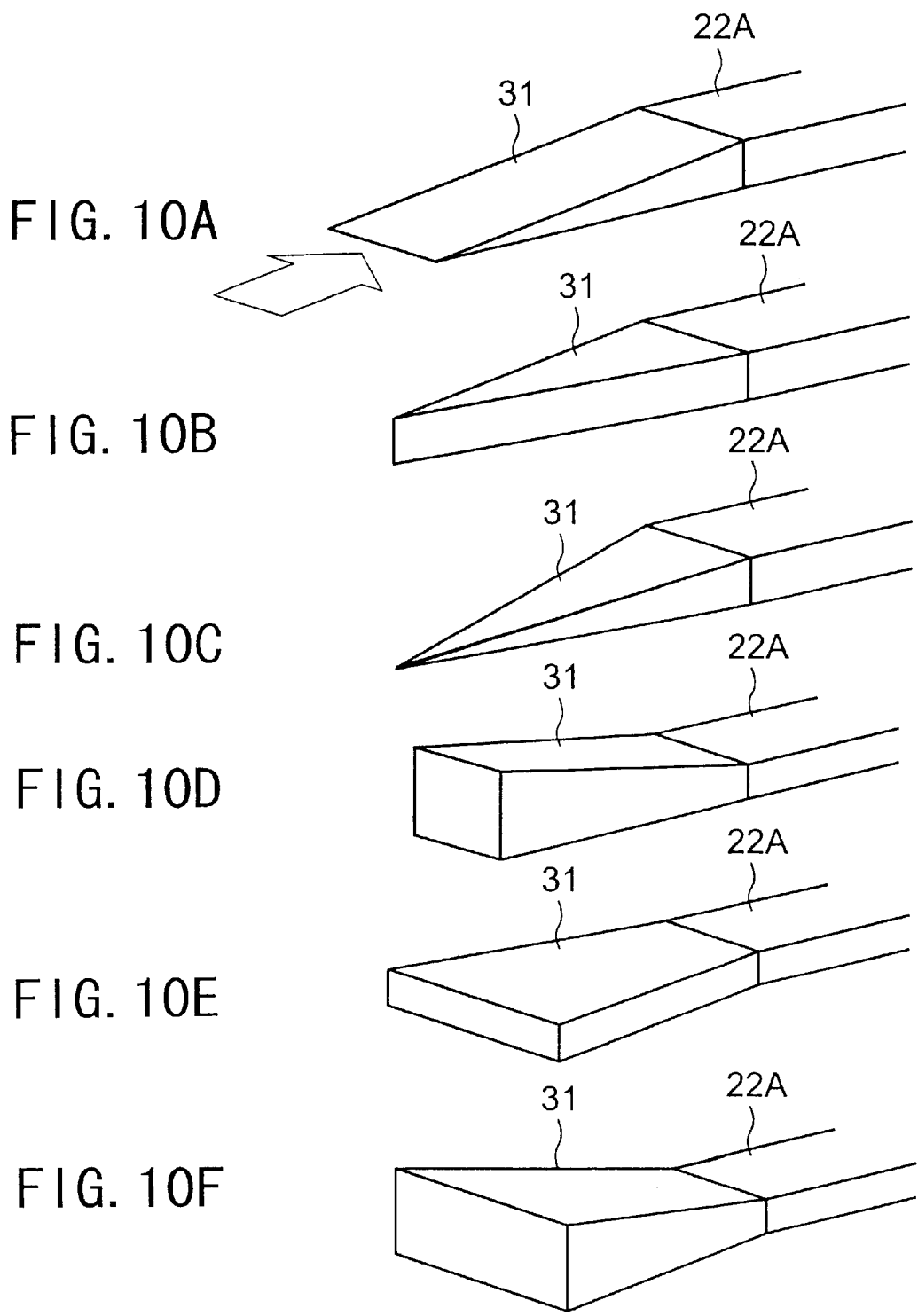
FIGS. 10A, 10B, 10C, 10D, 10E and 10F are diagrams showing various modifications of the optical-spot conversion part used in the optical semiconductor device of FIG. 9.

Referring to FIGS. 10A–10F, in the construction of FIG. 10A, the thickness alone is decreased continuously in the optical-spot conversion part 31 toward the distal end part to form a tapered structure, while in the construction of FIG. 10B, the width alone is decreased continuously toward the distal end part in the optical-spot conversion part 31 to form a tapered structure. Furthermore, in the example of FIG. 10C, both of the width and thickness of the spot-conversion part 31 are decreased toward the distal end part of optical-spot conversion part 31.

In the modification of FIG. 10D, on the other hand, only the thickness is increased in the optical-spot conversion part 31 continuously toward the distal end part, to form a tapered structure. In the modification of FIG. 10E, only the width is increased continuously in the optical-spot conversion part 31 toward the distal end part. Further, in the modification of FIG. 10F, both the width and thickness of the spot-conversion part 31 are increased toward the distal end part of optical-spot conversion part 31.

By using any of these structures of the optical-spot conversion part 31, the efficiency of optical coupling between the optical semiconductor device 30 of FIG. 9 and an external optical fiber is improved significantly.

Third Embodiment

Figure 11:
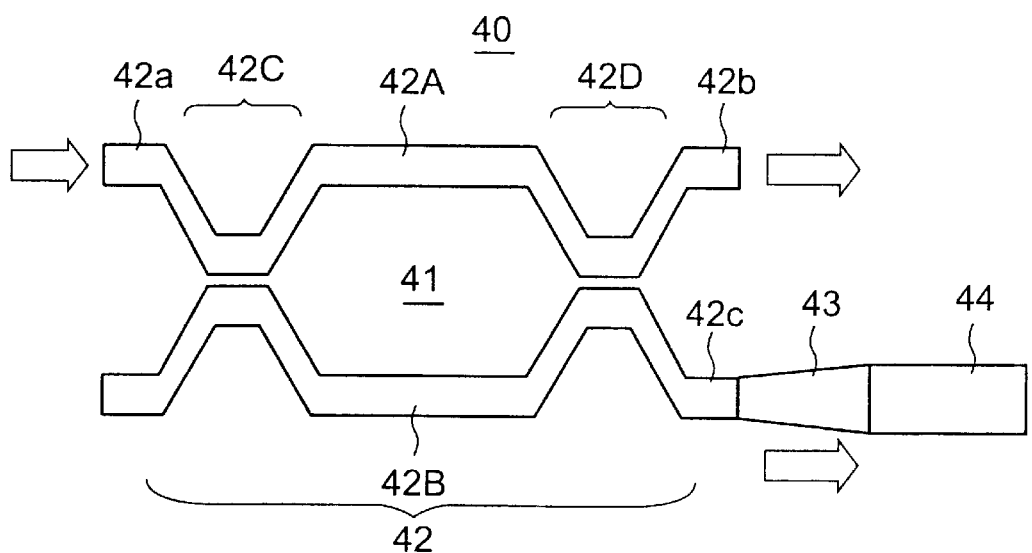
FIG. 11 is a diagram showing the construction of an optical semiconductor device according to a third embodiment of the present invention.

FIG. 11 shows the construction of an optical semiconductor device 40 according to a third embodiment of the present invention.

Referring to FIG. 11, the optical semiconductor device 40 is formed on a substrate 41 similar to the InP substrate 21 described before and includes two optical waveguides 42A and 42B optically coupled at locations 42C and 42D. Thereby, the optical waveguides 42A and 42B form an optical modulator 42 of Mach Zehnder-type. The optical waveguide 42A has an input end 42a to which an incident optical beam is injected and an output end 42b, while the optical waveguide 42B that is coupled optically to the optical waveguide 42A at the locations 42C and 42D has an optical spot conversion part 43 corresponding to the optical-spot conversion part 23 and an optical absorption layer 44 corresponding to the optical absorption layer 24 at an output end 42c.

It should be noted that the optical waveguides 42A and 42B, the optical-spot conversion part 43, and the optical absorption layer 44 are all formed to monolithic on the substrate 41, and thus, the optical semiconductor device 40 forms an the optical integrated circuit.

In the present embodiment, too, it is possible to use any of the constructions explained previously with reference to FIGS. 8A–8F that for the optical-spot conversion part 43.

Further, it is possible to form the optical-spot conversion part 31 explained previously with reference to FIGS. 10A–10F at an input end 42a of the optical waveguide 42A.

According to the present invention, it is not only possible to extract clock signals from an incoming optical signal as explained with reference to the preceding embodiments, but it is also possible to extract optical signal components, in the case a time-division multiplexed optical signal is supplied to the input end 42a, from time-division multiplexed optical signal. The optical signal components thus extracted are obtained at the output end 42b.

Fourth Embodiment

Figure 12:
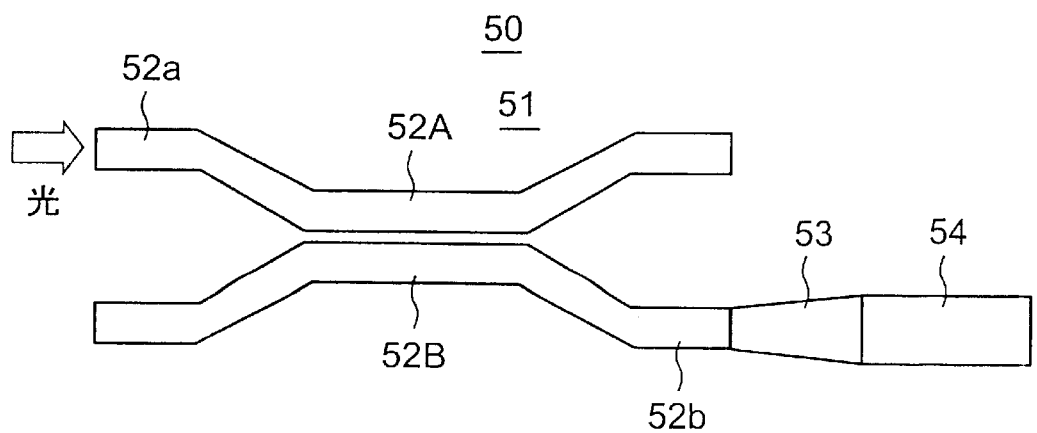
FIG. 12 is a diagram showing the construction of an optical semiconductor device according to a fourth embodiment of the present invention.

FIG. 12 shows the construction of an optical semiconductor device 50 according to a fourth embodiment of the present invention.

Referring to FIG. 12, the optical semiconductor device 50 is formed on a substrate 51 similar to the InP substrate 21 and includes optical waveguides 52A and 52B that are formed monolithically on the substrate 51. The optical waveguides 52A and 52B form a directional coupler. On the optical waveguide 52A, there is formed an electrode not illustrated similarly to the case of the microstrip electrode 26 explained previously. As a result, the directional coupler formed of the optical waveguides 52A and 52B functions as an optical modulator.

At the input end 52a of the optical waveguide 52A, there is supplied an incoming optical signal, and the optical signal comes out at the output end 52b of the optical waveguide 52B as an output optical signal after being modulated in the optical waveguide 52A. In the present embodiment, an optical-spot conversion part 53 similar to the optical-spot conversion part 23 is provided in continuation to the output end 52b, and the modulated optical signal is injected into an optical absorption layer 54 that forms a photodiode in correspondence to the optical absorption layer 24.

Figure 1:
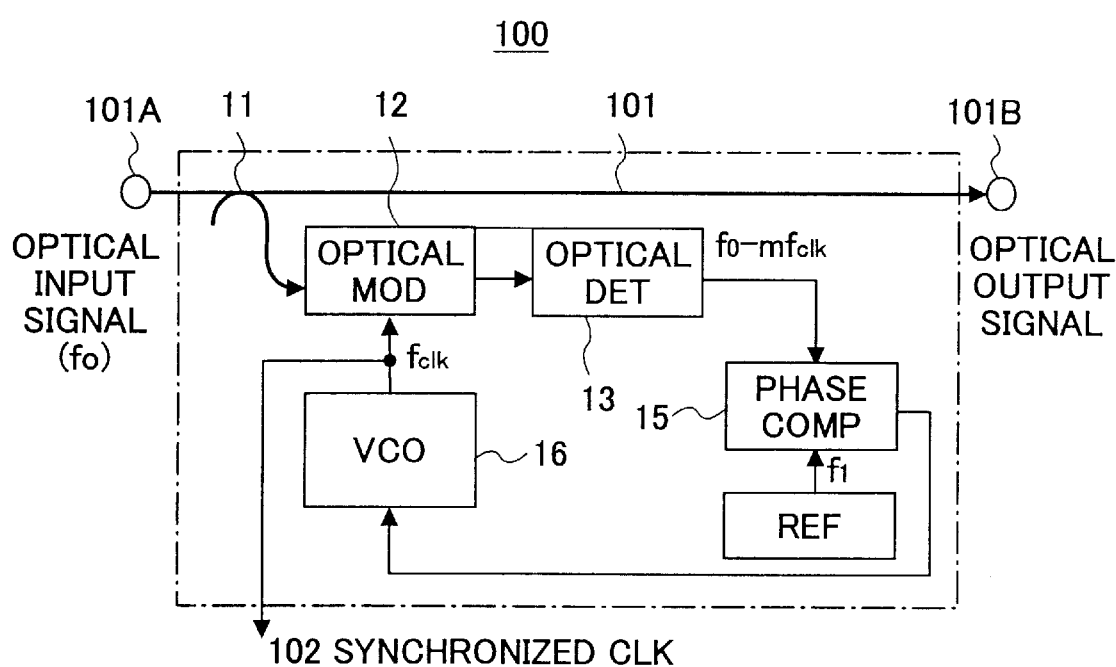
FIG. 1 is a diagram showing the construction of a conventional clock-extracting optical-detection device.

Thus, by using the optical semiconductor device 50 of such a construction in the clock-extracting optical-detection device 100 of FIG. 1, it becomes possible to implement the optical clock extraction by a compact, miniaturized construction.

Further, the present invention is not limited to the embodiments described heretofore, but various variations and modifications may be made without departing from the scope of the invention.

What is claimed is:

1. An optical semiconductor device, comprising:
a substrate;
an optical waveguide formed on said substrate, said optical waveguide constituting an interferometer-type optical modulator;
an optical absorption layer formed on said substrate in optical coupling with said interferometer-type optical modulator, said optical absorption layer forming an optical detector; and
an optical-spot conversion part interposed on said substrate between an output end of said optical waveguide and an input end of said optical absorption layer, said optical-spot conversion part converting a spot radius of an optical beam between said interferometer-type optical modulator and said optical detector,
said optical absorption layer extends in continuation to said optical-spot conversion part, so that substantially entire optical beam in said optical waveguide is injected to said optical absorption layer via said optical-spot conversion part.

2. An optical semiconductor device as claimed in claim 1, wherein said interferometer-type optical modulator comprises a Y-branched optical modulator.

3. An optical semiconductor device as claimed in claim 1, wherein said interferometer-type optical modulator comprises a Mach-Zehnder optical modulator.

4. An optical semiconductor device as claimed in claim 1, wherein said optical-spot conversion part comprises an optical waveguide pattern formed on said substrate between said optical waveguide forming said interferometer-type optical modulator and said optical absorption layer of said optical detector, said optical waveguide pattern having a first width corresponding to a width of said optical waveguide of said interferometer-type optical modulator at a first end thereof connected to said interferometer-type optical modulator and a second width corresponding to a width of said optical absorption layer at a second end thereof connected to said optical absorption layer of said optical detector, said optical waveguide pattern changing a width thereof between said first end and said second end.

5. An optical semiconductor device as claimed in claim 4, wherein said width of said optical waveguide pattern is changed continuously from said first end to said second end such that said optical waveguide pattern has a tapered form.

6. An optical semiconductor device as claimed in claim 4, wherein said width of said optical waveguide pattern is changed stepwise from said first end to said second end.

7. An optical semiconductor device as claimed in claim 1, wherein said optical-spot conversion part comprises an optical waveguide pattern formed on said substrate between said optical waveguide forming said interferometer-type optical modulator and said optical absorption layer of said optical detector, said optical waveguide pattern having a first thickness corresponding to a thickness of said optical waveguide of said interferometer-type optical modulator at a first end thereof connected to said interferometer-type optical modulator and a second thickness corresponding to a thickness of said optical absorption layer at a second end thereof connected to said optical absorption layer of said optical detector, said optical waveguide pattern changing a width thereof between said first end and said second end.

8. An optical semiconductor device as claimed in claim 7, wherein said thickness of said optical waveguide pattern is changed continuously from said first end to said second end such that said optical waveguide pattern has a tapered form.

9. An optical semiconductor device as claimed in claim 7, wherein said thickness of said optical waveguide pattern is changed stepwise from said first end to said second end.

10. An optical semiconductor device as claimed in claim 1, wherein said optical-spot conversion part comprises an optical waveguide pattern formed on said substrate between said optical waveguide forming said interferometer-type optical modulator and said optical absorption layer of said optical detector, said optical waveguide pattern having a first width and a first thickness corresponding respectively to a width and a thickness of said optical waveguide of said interferometer-type optical modulator at a first end thereof connected to said interferometer-type optical modulator and a second width and a second thickness respectively corresponding respectively to a width and a thickness of said optical absorption layer at a second end thereof connected to said optical absorption layer of said optical detector, said optical waveguide pattern changing a width thereof between said first end and said second end.

11. An optical semiconductor device as claimed in claim 10, wherein said width and said thickness of said optical waveguide pattern are changed continuously from said first end to said second end such that said optical waveguide pattern has a tapered form.

12. An optical semiconductor device as claimed in claim 10, wherein said width and said thickness of said optical waveguide pattern are changed stepwise from said first end to said second end.

13. An optical semiconductor device as claimed in claim 10, wherein one of said width and thickness of said optical waveguide pattern is changed continuously from said first end to said second end, and wherein the other of said width and thickness of said optical waveguide pattern is changed stepwise from said first end to said second end.

14. An optical semiconductor device as claimed in claim 1, wherein said optical waveguide forming said interferometer-type optical modulator further has an incident beam spot conversion part at an input end thereof opposite to said input end thereof.

15. An optical semiconductor device as claimed in claim 14, wherein said optical waveguide changes a width thereof said incident beam spot conversion part toward said input end.

16. An optical semiconductor device as claimed in claim 15, wherein said width of said optical waveguide is changed continuously toward said input end in said incident beam spot conversion part, said optical waveguide thereby forming a tapered structure in said incident beam spot conversion part.

17. An optical semiconductor device as claimed in claim 15, wherein said width of said optical waveguide is changed stepwise toward said input end in said incident beam spot conversion part.

18. An optical semiconductor device as claimed in claim 14, wherein said optical waveguide changes a thickness thereof in said incident beam spot conversion part toward said input end.

19. An optical semiconductor device as claimed in claim 18, wherein said thickness of said optical waveguide is changed continuously toward said input end in said incident beam spot conversion part, said optical waveguide thereby forming a tapered structure in said incident beam spot conversion part.

20. An optical semiconductor device as claimed in claim 18, wherein said thickness of said optical waveguide is changed stepwise toward said input end in said incident beam spot conversion part.

21. An optical semiconductor device as claimed in claim 14, wherein said optical waveguide changes a width and a thickness thereof in said incident beam spot conversion part toward said input end.

22. An optical semiconductor device as claimed in claim 21, wherein said width and said thickness of said optical waveguide are changed continuously toward said input end in said incident beam spot conversion part, said optical waveguide thereby forming a tapered structure in said incident beam spot conversion part.

23. An optical semiconductor device as claimed in claim 21, wherein said width and said thickness of said optical waveguide are changed stepwise toward said input end in said incident beam spot conversion part.

24. An optical semiconductor device as claimed in claim 21, wherein one of said width and said thickness of said optical waveguide is changed continuously toward said input end in said incident beam spot conversion part, said optical waveguide thereby forming a tapered structure in said incident beam spot conversion part, and wherein the other of said width and said thickness of said optical waveguide is changed stepwise toward said input end.

* * * * *